(12) United States Patent
Moon et al.

(10) Patent No.: US 8,407,744 B2
(45) Date of Patent: Mar. 26, 2013

(54) SNAPSHOT RECOGNITION FOR TV

(75) Inventors: Hannah Y. Moon, Boston, MA (US); D. Beau Morley, Somerville, MA (US); Alexander N. Zaenchik, Swampscott, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 510 days.

(21) Appl. No.: 11/765,219

(22) Filed: Jun. 19, 2007

(65) Prior Publication Data

US 2008/0320546 A1    Dec. 25, 2008

(51) Int. Cl.
*G06F 3/00* (2006.01)
*G06F 13/00* (2006.01)
*H04N 5/445* (2006.01)
*H04N 7/16* (2006.01)

(52) U.S. Cl. ............... 725/60; 725/40; 725/51; 725/52; 725/53; 725/136

(58) Field of Classification Search .............. 725/40, 725/51, 52, 53, 60, 136
See application file for complete search history.

(56) References Cited

U.S. PATENT DOCUMENTS

| 6,469,749 | B1* | 10/2002 | Dimitrova et al. ............ 348/722 |
| 6,629,092 | B1* | 9/2003 | Berke ............................ 707/706 |
| 7,444,659 | B2* | 10/2008 | Lemmons ........................ 725/34 |
| 7,698,261 | B1* | 4/2010 | Khoshnevisan ....... 707/999.003 |
| 2002/0083469 | A1* | 6/2002 | Jeannin et al. ................ 725/135 |
| 2003/0131357 | A1* | 7/2003 | Kim ................................ 725/60 |
| 2004/0250278 | A1* | 12/2004 | Imai et al. ....................... 725/40 |
| 2005/0203812 | A1* | 9/2005 | Sako et al. ...................... 705/27 |
| 2006/0112081 | A1* | 5/2006 | Qureshi ............................. 707/3 |
| 2007/0094703 | A1* | 4/2007 | Nygaard et al. .............. 725/135 |

OTHER PUBLICATIONS

Greene Kate, "Mobile Web Searches Using Pictures", Technology Review, Tuesday, Mar. 13, 2007.*
Greene, Kate, "Mobile Web Searches Using Pictures", Technology Review Published by MIT, Mar. 12, 2007.

* cited by examiner

*Primary Examiner* — Scott Beliveau
*Assistant Examiner* — Yassin Alata (57) ABSTRACT

A system may include logic to provide a video program to a video display, logic to provide interactive content to indicate that a snapshot of the video program can be captured, and snapshot capturing logic to capture a video frame of the video program.

24 Claims, 7 Drawing Sheets

SNAPSHOT RECOGNITION FOR TV

BACKGROUND INFORMATION

With an aim toward enhancing a television (TV) viewer's experience, the development of interactive television is emerging. Recently, TV service providers, content providers, and advertisers have supplemented linear programming with interactive features that allow the TV viewer to interact using his/her remote control. Typically, the TV viewer is relegated to pressing an inordinate number of buttons to input information (e.g., entering text or selecting from layers of lists or menus) in order to obtain desired information.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Implementations described herein may provide interactive features that permit a TV viewer to capture a snapshot (e.g., a frame of video and/or multiple frames of video) during a program that may be utilized to retrieve desired information of an object and/or a service contained within the snapshot. A program, as used herein, is intended to be broadly interpreted to include any form of content (e.g., TV shows, commercials, infomercials, movie trailers, music programs, or on-demand services, such as video, games, or music), for which interactive features may be provided.

Figure 1:
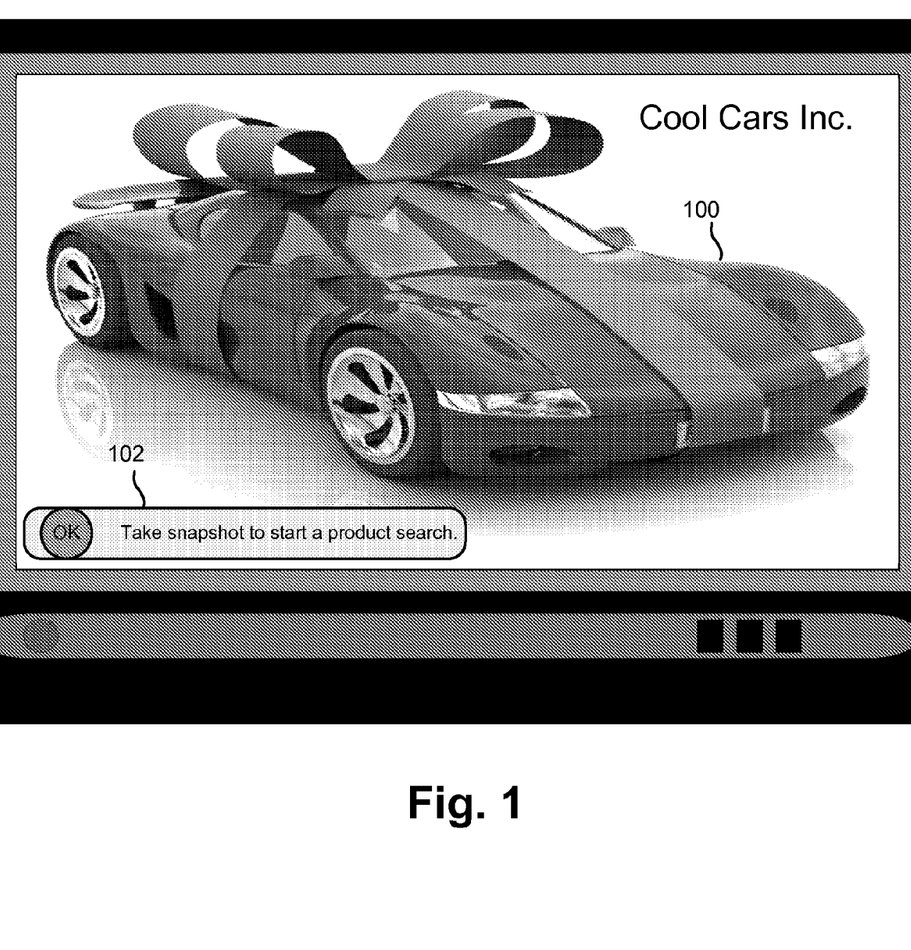
FIG. 1 is a diagram that illustrates an overview of an implementation described herein.

FIG. 1 is a diagram that illustrates an overview of an implementation described herein. A TV viewer may be viewing a TV that displays a commercial advertising a new car. As illustrated in FIG. 1, Cool Cars Inc. may be advertising a new car 100. The TV viewer may be interested in finding out more information about new car 100. During the commercial, a graphical user interface (GUI) component 102 may appear, such as an overlay, to notify the TV viewer that he/she may capture a snapshot of the commercial. For example, GUI component 102 may indicate that the TV viewer may capture a snapshot of new car 100 by selecting [OK]. The TV viewer may select [OK] (e.g., with a remote control) and a snapshot of the commercial including new car 100 may be captured. The snapshot may be sent to a snapshot search system.

The snapshot search system may identify an object within the snapshot. For example, the snapshot search system may perform an object recognition process based on the snapshot. In this example, the object within the snapshot may be new car 100. In other instances, there may be more than one object. The snapshot search system may conduct a search based on the object. The snapshot search system may conduct a search within a repository, such as an asset repository. For example, the asset repository may include multimedia assets that may be located in, for example, TV program content, a video-on-demand (VOD) system, an interactive application system, and/or other types of content. The snapshot search system may retrieve information relating to the object.

The TV viewer may be presented with a search result retrieved from the snapshot search system. For example, the search result may include a list of local car dealers (i.e. local in relation to the TV viewer's resident address) that may sell new car 100. Each entry of the list may include a snapshot of new car 100, and the name, address, and/or telephone number of each car dealer that sells new car 100. The snapshot search system may provide interactive content associated with the search result. The TV viewer may be able to obtain additional information relating to new car 100, such as specification and option information of new car 100, by navigating through the interactive content.

In the description to follow, interactive features and systems that allow a TV viewer to capture a snapshot during a program, and conduct a search and retrieve information based on the snapshot will be described.

Figure 2:
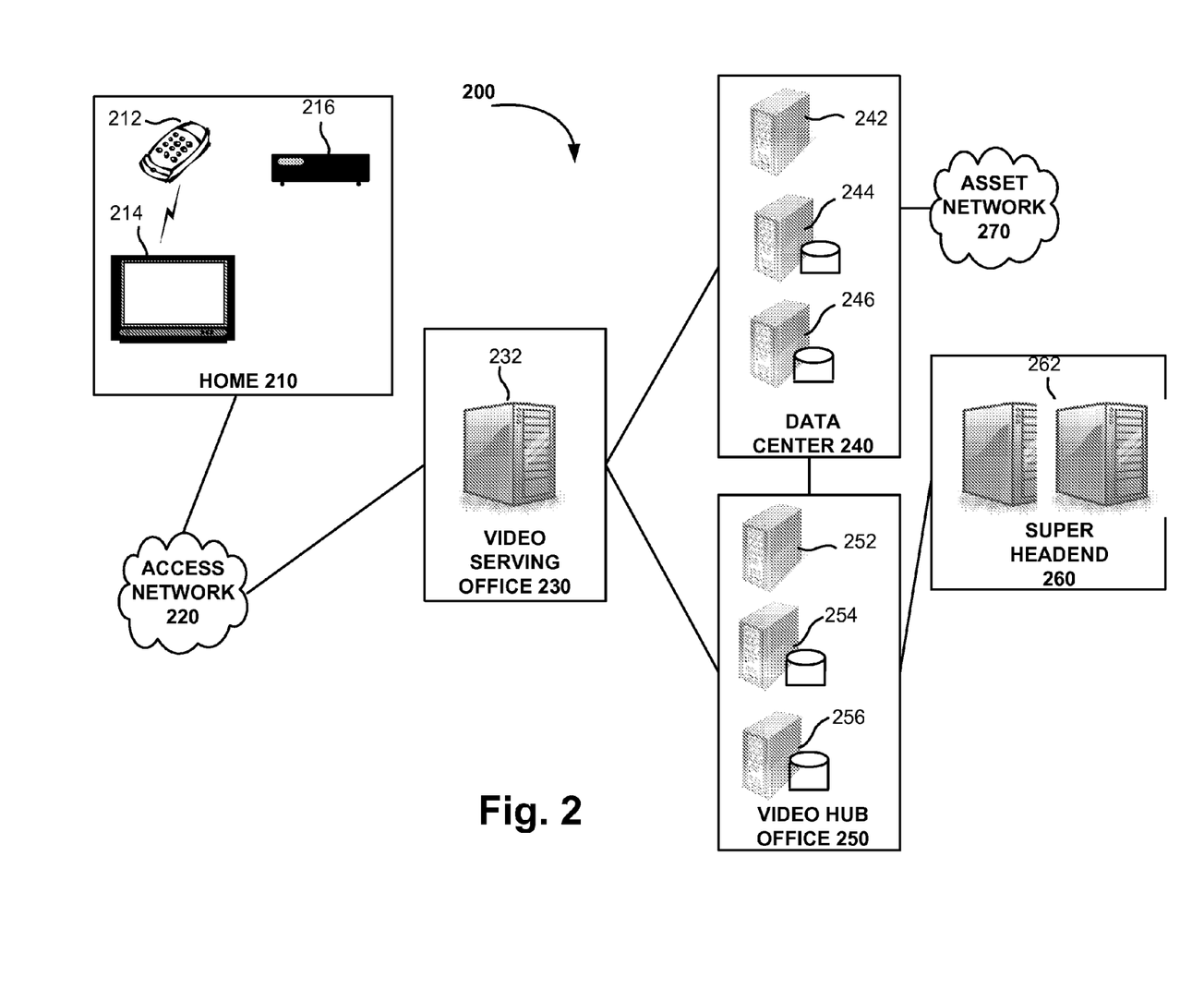
FIG. 2 is an exemplary diagram of a network in which systems and methods described herein may be implemented.

FIG. 2 is an exemplary diagram of a network 200 in which systems and methods described herein may be implemented. Network 200 may include a home network 210, an access network 220, a video serving office 230, a data center 240, a video hub office 250, a super headend 260, and an asset network 270.

In practice, network 200 may include additional, fewer, or different components than those illustrated in FIG. 2. Also, two or more of these components may be implemented within a single component, and/or a single component may be implemented as multiple, distributed components. Further, while FIG. 2 illustrates direct connections between the various components, any of these connections may be indirectly made via a node, a network, or a combination thereof. In addition, home network 210, access network 220, video serving office 230, data center 240, video hub office 250, super headend 260, and asset network 270 may include other functional, operational, and/or structural features than those described below.

Home network 210 may include a remote control 212, a video display device 214, and a video client 216. Remote control 212 may include any device capable of remotely controlling the operation of video client 216 and/or video display device 214. Remote control 212 may transmit signals, such as infrared signals, to a reader associated with video client 216 and/or video display device 214.

Video display device 214 may include any device capable of receiving and reproducing video signals. In one implementation, video display device 214 may include a TV. In another implementation, video display device 214 may include a computer monitor, a display of a stationary communication device (e.g., a telephone), or a display of a portable communication device (e.g., a mobile telephone or a personal digital assistant (PDA)).

Video client 216 may include any device capable of receiving, transmitting and/or processing information to and from access network 220. Video client 216 may provide video signals to video display device 214. Video client 216 may include decoding and/or decryption capabilities. Video client 216 may include a digital video recorder (DVR) (e.g., a hard drive). In one implementation, video client 216 may include a set top box. In another implementation, video client 216 may include a computer device, a cable card, a TV tuner card, a stationary device (e.g., a telephone or a computer), or a portable communication device (e.g., a mobile telephone or a PDA). In one implementation, video client 216 may be capable of providing interactive content and capturing a snapshot.

Access network 220 may include one or more series of points or nodes interconnected by communication paths or links. Access network 220 may include a video signaling and distribution network and system. In one implementation, for example, access network 220 may include a wide area network (WAN), an intranet, a local area network (LAN), a telephone network (e.g., a public switched telephone network (PSTN) or a wireless network), or a combination of networks. Access network 220 may provide home network 210 access to programs.

Video serving office 230 may include any device capable of providing interconnection to video hub office 250 and data center 240. In one implementation, video serving office 230 may include a multiplexer/demultiplexer (MUX/DeMUX) 232. MUX/DeMUX 232 may provide multiplexing/demultiplexing of information. In one implementation, a central office may include video serving office 230.

Data center 240 may include snapshot search system 242, a snapshot storage 244, and a metadata storage 246. Snapshot search system 242 may include any logic capable of conducting a search and retrieving information based on a snapshot. Logic, as used herein, may include hardware (e.g., an application specific integrated circuit (ASIC), a field programmable gate array (FPGA)), software, a combination of software and hardware, or a hybrid architecture. Snapshot search system 242 may reside in any backend component of network 200, such as data center 240. In another implementation, one or more components of snapshot search system 242 may reside in home network 210, such as in video client 216.

Snapshot search system 242 may include an object recognition system that is capable of providing object recognition. The object recognition system may include any logic that performs object recognition, as described herein. In practice, the object recognition system may be implemented employing hardware, software, a combination of hardware and software, and/or a hybrid architecture. The object recognition system may provide object recognition for a two-dimensional (2D) object (e.g., a picture of a compact disc (CD) cover) and/or a three-dimensional (3D) object (e.g., a person's face or a car) based on a captured frame or multiple frames of a program. The object recognition system may identify an object. An object, as used herein, is intended to be interpreted broadly to include any thing or person within the snapshot. For example, the object may be a logo or a person associated with a service, or a product, such as a car.

Snapshot storage 244 may include any device capable of storing information, such as a memory, a storage medium, and/or a mass storage device. Snapshot storage 244 may include logic for storing/retrieving information to, for example, the memory, the storage medium, and/or the mass storage device. For example, snapshot storage 244 may include a server. In one implementation, snapshot storage 244 may reside in any backend component of network 200, such as data center 240. In another implementation, snapshot storage 244 may reside in home network 210, such as in video client 216. For example, snapshot storage 244 may be a DVR residing in video client 216, or a DVR residing in display device 214. Snapshot storage 244 may store image information, such as snapshots of a program and/or images of an object. Snapshot storage 244 may store images and other information facilitating object recognition processes.

Metadata storage 246 may include any device capable of storing information, such as a memory, a storage medium, and/or a mass storage device. Metadata storage 246 may include logic for storing/retrieving information to, for example, the memory, the storage medium, and/or the mass storage device. For example, metadata storage 246 may include a server. In one implementation, metadata storage 246 may reside in any backend component of network 200, such as data center 240. Metadata storage 246 may store metadata that may include additional information relating to an object and/or information relating to the TV viewer. Additional information relating to an object may include, for example, color, price, similar product information, movie related information, video game related information, or music related information. Alternatively, or additionally, information relating to the TV viewer may include, for example, a postal code corresponding to a residence of the TV viewer (e.g., Zone Improvement Plan (ZIP) code), demographic of the TV viewer's household, or the TV viewer's preferences (e.g., color, size of clothing, manufacturer, cost).

Video hub office 250 may include broadcast systems and content for distribution, such as video-on-demand (VOD) 252, interactive applications and interactive program guide (IPG) 254, and regional content 256. VOD 252, interactive applications and IPG 254, and regional content 256 may include, for example, servers and mass storage devices. VOD 252 may include content such as movies or television programs that may be viewed by a TV viewer upon request (i.e., on-demand). Interactive applications and IPG 254 may include content, for example, a listing and/or a schedule of programs available for viewing. Interactive applications and IPG 254 may include content, such as special promotions or discounts, interactive advertisements, sports statistics, or offers of audio or video information for playing or purchasing. Interactive applications and IPG 254 may also include interactive content for capturing a snapshot of a program, as well as other menu features (e.g., accessing saved snapshots and saved search results). Regional content 256 may include, for example, news programs, independent channel programming, movies, sports programs, religious programs, music programs, and/or commercials.

The content of video hub office 250 may be arranged and/or indexed to facilitate object recognition and/or searches, as described herein. Additionally, the content of video hub office 250 may provide an object of interest at varying scales and poses, so as to facilitate object classification and object identification by the object recognition system of snapshot search system 242. The content of video hub office 250 may include multimedia assets such as digital pictures, programs, and/or additional information related to the object.

Super headend 260 may include broadcast systems and content for distribution. In one implementation, super headend 260 may include broadcast systems to acquire, aggregate and distribute national content to video hub office 250. Super headend 260 may include servers and mass storage devices. National content may include, for example, television programs, movies, premier channel programming, news programs, sports programs, religious programs, music programs, and/or commercials.

Asset network 270 may include one or more series of points or nodes interconnected by communication paths or links. Asset network 270 may include a repository of multimedia assets that may be searched by snapshot search system 242. For example, asset network 270 may include the Internet, or any other public and/or private network.

Figure 3:
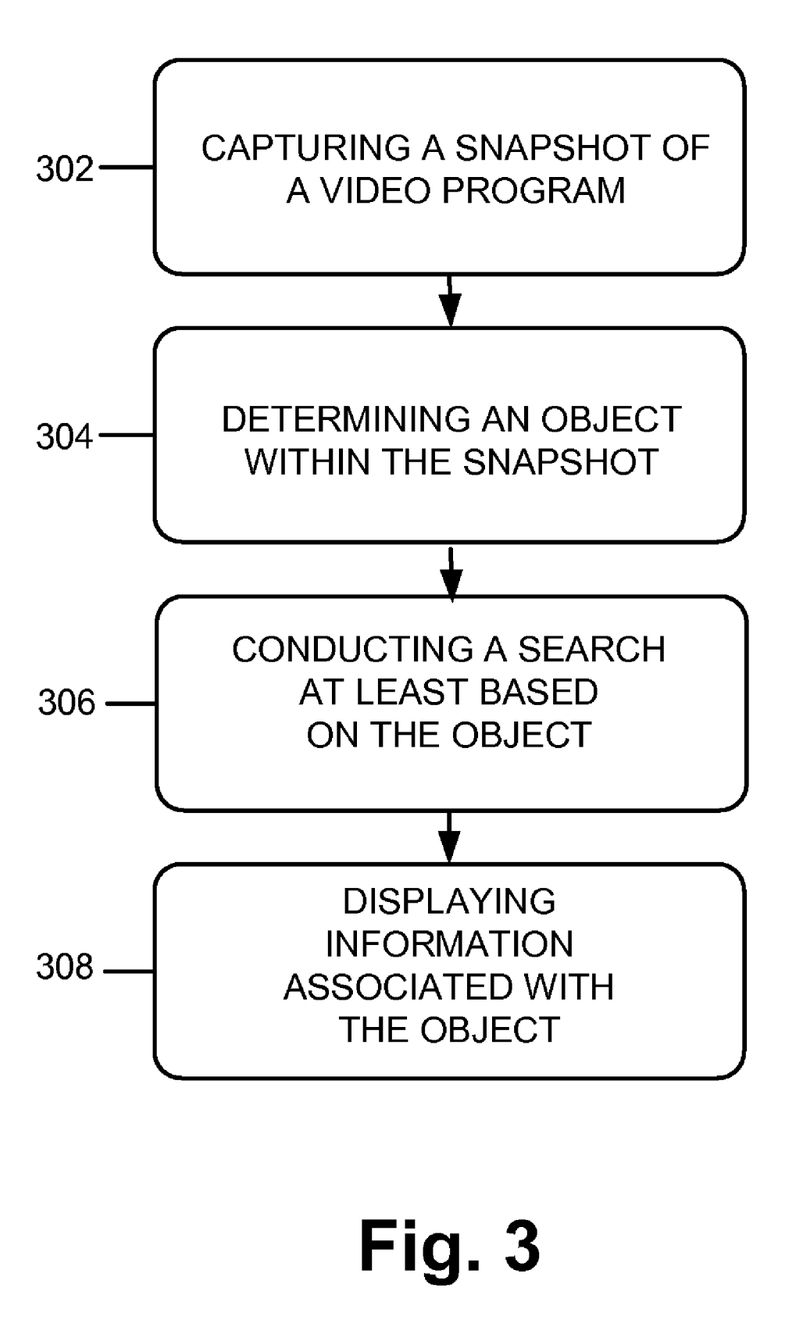
FIG. 3 depicts a flow chart of an exemplary process for conducting a search based on a snapshot from a video program.

FIG. 3 depicts a flow chart of an exemplary process for conducting a search based on a snapshot from a program.

The exemplary process may include capturing a snapshot of a video program (block 302). For example, when a user powers up video display 214 and/or video client 216 using remote control 212, the user may watch a video program. During the video program, interactive content may be displayed to indicate to the user that he/she may capture a snapshot (e.g., a frame of video or multiple frames of video) of the video program. For example, the interactive content may be, for example, an overlay displayed during the video program. Additionally, interactive content may be displayed to indicate to the user that he/she may capture a snapshot when the user is viewing, for example, a programming guide, a program information page, or a program status bar. Additionally, or alternatively, the user may be able to capture a snapshot without a prompt (e.g., without an overlay) being displayed, as described below.

There are various ways in which the interactive content for capturing the snapshot may be provided. For example, commercials and VOD programs, may allow preprocessing procedures to be utilized to provide the interactive content since these types of video programs may be re-aired continually for a period of time. Other types of video programs may be pre-taped, and aired, for example, days later. Thus, interactive content may be provided in these types of video programs. In even other types of video programs, such as live programs, the user may capture a snapshot without interactive content prompting the user. For example, the user may activate a generic snapshot function with, for example, remote control 212. In such an instance, the user may select the object within the snapshot by using a movable pointer of remote control 212. In such an implementation, video client 216 may include logic to provide this feature. In this way, the user may select the object and capture a snapshot during a live video program, or during any other type of program, such as commercials, VOD programs, etc.

When the interactive content is displayed, the user may make a selection to capture a snapshot. The user may respond to the interactive content with, for example, remote control 212. Understandably, however, given the various types of video display 214, the user may be able to capture a snapshot of a video program in response to the interactive content, without employing remote control 212. For example, when video display 214 is a personal computer, an input device, such as a mouse or keypad may allow the user to indicate that he/she wishes to capture a snapshot of the video program. Other devices utilized as video display 214, not specifically mentioned herein, may include an interactive input mechanism that would allow the user to provide an indication in response to the interactive content that he/she wishes to capture the snapshot of the video program.

In one implementation, the video frame(s) may be obtained from, for example, a video buffer. When the snapshot is captured, for example, the airing of the video program may continue to be displayed by video display 214 in, for example, a scaled down window (e.g., picture-in-picture (PIP)), and the remainder of the screen of video display 214 may display a freeze frame of the captured snapshot. In another implementation, video display 214 may display a divided screen (e.g., a split screen).

The snapshot may be stored in, for example, video client 216 or snapshot storage 244. Depending on where snapshot search system 242 resides, for example, in data center 240 or in video client 216, snapshot search system 242 may access the stored snapshot. For example, when the snapshot is stored in video client 216, and snapshot search system 242 resides in data center 240, video client 216 may communicate with snapshot search system 242 (e.g., transmit the snapshot to snapshot search system 242).

When the user captures a snapshot, the interactive content may provide the user with various options that the user may select. For example, the user may have the option of conducting a search based on the snapshot. Additionally, the user may have the option to save the snapshot and conduct a search at a later time. For example, the user may have the option to view saved snapshots. Upon such a request, for example, video display 214 may display a saved snapshot screen that contains saved snapshots. The saved snapshot screen may be interactive and allow the user to select various options, such as deleting a saved snapshot or conducting a search.

The exemplary process may include determining an object within the snapshot (block 304). For example, snapshot search system 242 may utilize the snapshot to determine the object within the snapshot. The process by which snapshot search system 242 determines the object within the snapshot may vary, as described in greater detail below. Further, in some cases, snapshot search system 242 may determine more than one object within the snapshot.

In one implementation, the object recognition system of snapshot search system 242 may determine the object based on the snapshot. It is to be understood that the object recognition system may be implemented in a number of ways. Accordingly, the implementations described below are exemplary in nature, and fewer, additional, or different components and/or processes may be employed. Additionally, the implementations described below are not restricted to the order in which they have been described below.

In one implementation, the snapshot may be used by the object recognition system to perform, for example, object categorization and object identification. For example, descriptors that characterize some property of a region of the snapshot may be employed. Each descriptor may surround a basis point (e.g., a region of the snapshot). The descriptors may be local, regional and/or global point descriptors. A modeled-based comparison may be implemented for determining discriminatory aspects of an object within the snapshot. The object recognition system may perform object recognition by referring to content in video hub 250 and/or access network 270. The content may include global image models and object specific identifiers that may be compared to the descriptors of the object in the snapshot. In this way, object categorization and object identification may be achieved.

In one implementation, the object recognition system may determine object categorization of the object and/or object identification of the object based on the snapshot. Snapshot search system 242 may refer to the content of video hub office 250 and/or asset network 270 to perform object recognition. The content of video hub office 250 and/or the content of asset network 270 may be arranged and/or indexed to facilitate object recognition.

In another implementation, for example, the video program from which the snapshot was captured may include tag information. The tag information may be stored with the snapshot and/or communicated to snapshot search system 242 (e.g., by video client 216) when a snapshot is taken. Snapshot search system 242 may determine the object based on the tag information. For example, when the video program from which the snapshot is captured is, for example, a commercial, such as a Ford truck commercial, snapshot search system 242 may determine that the snapshot includes a Ford truck based on the tag information. In another example, snapshot search system 242 may be directed to a particular repository of video hub office 250 and/or asset network 270 based on the tag information so that the object may be determined. That is, in one implementation, the category of the object may be determined based on the tag information, with or without the object recognition system. In another implementation, the identification of the object may be determined based on the tag information, with or without the object recognition system. Other types of video programs may provide analogous tag information that would allow a determination of the object in the snapshot. Additionally, closed captioning information may provide information useful to the objection recognition system.

In still another implementation, snapshot search system 242 may obtain channel information (e.g., from video client 216) that may used to determine the object. For example, a food network that regularly airs on a certain channel may customarily advertise kitchenware, such as pots and food processors, a music channel may customarily advertise music-related items (e.g., CDs), or a game channel may customarily advertise games (e.g., Playstation 3 games). Snapshot search system 242 may determine the object based on this channel information.

In one implementation, snapshot search system 242 may provide interactive content that permits the user to confirm that the object is correctly determined (e.g., in terms of category or identification). For example, snapshot search system 242 may display interactive content that provides the object categorization (e.g. object is a car) or identification (e.g., object is a 2007 Chevrolet Corvette Z06)

Snapshot search system 242 may provide interactive content. In some instances, snapshot search system 242 may determine more than one object. For example, when the object recognition system identifies more than one object in the snapshot, the object recognition system may determine the object categorization of each of the objects. In such an instance, snapshot search system 242 may display a visual indicator (e.g., a transparent overlay, a pointer, or highlighting) that indicates each of the objects within the captured snapshot. The user may select the object to be searched, and the snapshot search system 242 may conduct a search based on the selected object. In another implementation, for example, the object recognition system may determine the object identification of each of the objects. In such an instance, the snapshot search system 242 may display a visual indicator that indicates each of the objects within the captured snapshot. The user may select the object to be searched, and the snapshot search system 242 may conduct a search based on the selected object.

In other instances, when only one object is determined within the captured snapshot, snapshot search system 242 may automatically conduct the search without requiring a selection from the user. In another implementation, snapshot search system 242 may request a selection from the user, regardless of the number of objects within the captured snapshot. That is, snapshot search system 242 may display a visual indicator regardless of the number of determined objects.

The exemplary process may include conducting a search based on the object (block 306). When the object is identified (e.g., object identification), snapshot search system 242 may conduct a search for information associated with the object. The extent of the search, such as the amount of content and/or what content of video hub office 250 and/or asset network 270 is searched may vary depending on the product, the program and/or the search criteria. In other words, snapshot search system 242 may conduct a restrictive search or a more general search depending on the product, the program and/or the search criteria. In some instances, the user may wish to add search criteria to the search (e.g., in addition to the object) that may be utilized by snapshot search system 242. For example, the user may include user preferences or information from metadata storage 246. In this way, the user may tailor a search conducted by snapshot search system 242.

Snapshot search system 242 may retrieve information from the content of video hub office 250 and/or asset network 270. Snapshot search system 242 may provide the retrieved information to video client 216 so that the retrieved information may be displayed on video display 214. Snapshot search system 242 may provide interactive content to manage the search results, such as saving a search result, deleting a search result, forwarding the search result to another communication service, such as an e-mail, or forwarding the search result to another device, such as a mobile phone.

The exemplary process may include displaying information associated with the object (block 308). For example, snapshot search system 242 may provide search results to the user. The search results may be displayed on video display 214 and may include interactive content. In one implementation, the search results may include an image of the object (e.g, a picture or a video clip) and/or text information relating to the object. The text information may include, for example, where to purchase the object, price information, or details relating to the object (e.g., available colors, models, or features of the object). Depending on the criteria of the search, the search results may be in list form. Additionally, the search results may be saved, and/or forwarded to another device for later retrieval by the user. The search results may be saved, for example, on video client 216 or on a backend component, such as in data center 240. The search results may be forwarded to another device, for example, via asset network 270.

FIGS. 4-7 are diagrams that illustrate exemplary interactive content for implementations described herein. A TV viewer may be watching a video program displayed on video display device 214, such as a TV. The TV viewer may have in his/her possession remote control 212.

Figure 4:
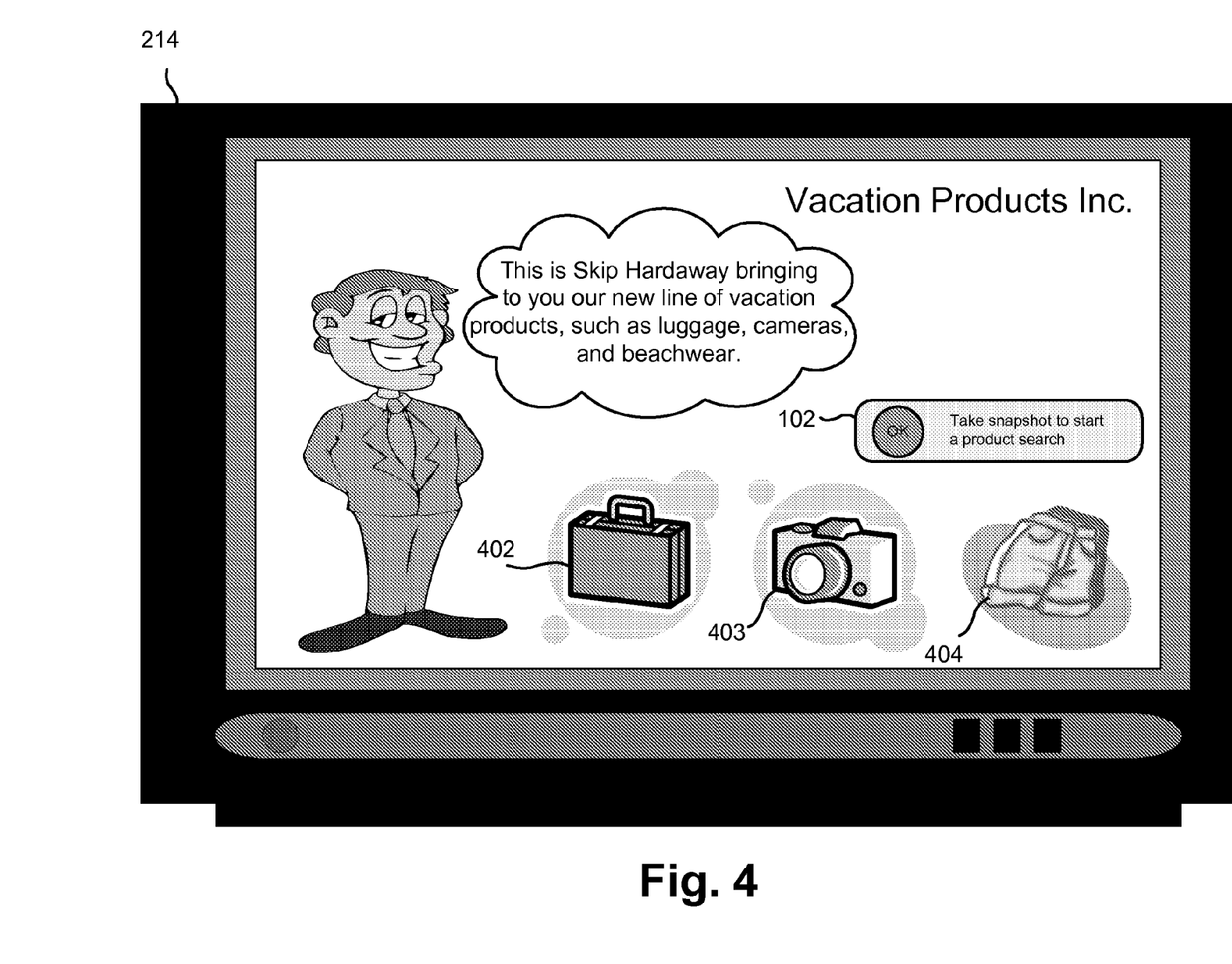
FIGS. 4-7 are diagrams that illustrate exemplary interactive content for implementations described herein.

FIG. 4 illustrates, among other things, GUI component 102, luggage 402, camera 403, and beachwear 404. In other implementations, fewer, additional, or different components may be employed.

Referring to FIG. 4, the TV viewer is watching a program, such as a commercial (e.g., a Vacation Products Inc. commercial). As illustrated in FIG. 4, a commentator, Skip Hardaway, may be selling a new line of vacation products, such as luggage 402, camera 403, and beachwear 404. During the program, GUI component 102 may appear, and the TV viewer may wish to find out more information about camera 403. As indicated by GUI component 102, the user may capture a snapshot to start a product search. The user may select [OK] using remote control 212 to take a snapshot of the program.

Figure 5:
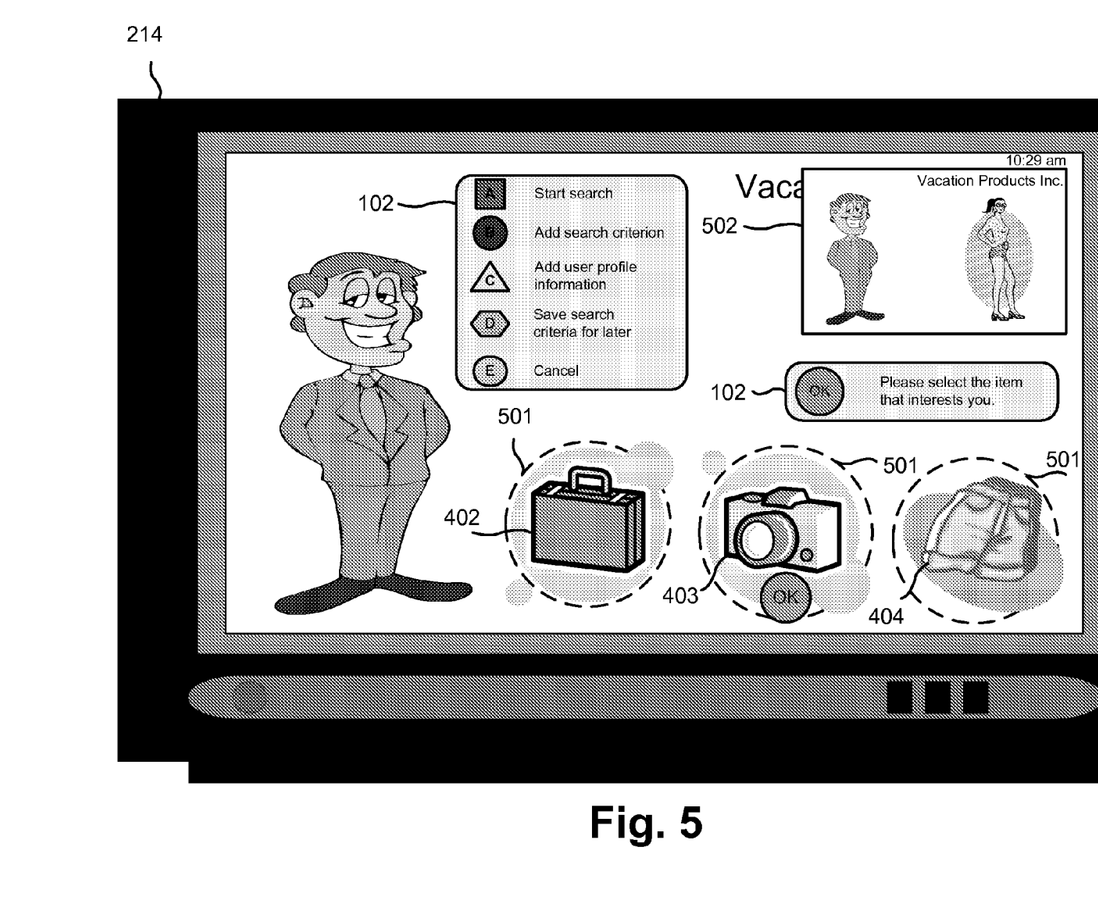

FIG. 5 is a diagram illustrating exemplary content displayed to the TV viewer when a snapshot is captured. FIG. 5 illustrates, among other things, GUI component 102, an object indicator 501, and a scaled-down window 502. Referring to FIG. 5, a portion of the screen may pause at the instant that the frame of video was captured. Another portion of the screen, such as scaled-down window 502, may include the continuing broadcast of the Vacation Products commercial. Snapshot search system 242 may include indicators identifying the objects that the TV viewer may select for initiating a search. For example, luggage 402, camera 403, and beachwear 404 may each have a corresponding object indicator 501 that surrounds them. In other implementations, other visual cues or indicators may be employed to indicate the objects (e.g., highlighting, a transparent overlay, a pointer).

The TV viewer may select any one of object indicators 501 with, for example his/her remote control 212 (e.g., with a cursor button and an ENTER button). The TV viewer may select camera 403 as the object to be searched. The interactive content of GUI component 102 may offer additional selections to the TV viewer. In one implementation, for example, the interactive content of GUI component 102 may include the following selections, such as [A] to start a search, [B] to add search criteria, [C] to add user profile information, [D] to save search criteria for later, and [E] to cancel. The TV viewer may be able to select any one of these options using remote control 212 (e.g., with the cursor button and the ENTER button).

The TV viewer may select [A] to begin the search. In other instances, the TV viewer may wish to add one or more search criteria to the search. The TV viewer may select [B] to add search criterion. In one implementation, for example, when the TV viewer selects [B], the TV viewer may be able to select from an interactive menu system (not illustrated) additional search criterion (e.g. size, color, price range) that may be used by snapshot search system 242. When the TV viewer selects [C], pre-stored user profile information may be added as search criteria (e.g., zip code of the TV viewer, demographic of the TV viewer's household, TV viewer preferences (e.g., color, manufacturer)). Accordingly, the TV viewer may have the option to further refine the search by adding search criteria, in addition to the information relating to the object (e.g., camera 403).

The TV viewer may also have the option to save the search criteria by selecting [D]. The saving of search criteria, as well as the saving of search results will be described below in reference to FIG. 6 and FIG. 7. The TV viewer may also cancel by selecting [E].

The snapshot may be stored in a set top box that has DVR space. In another implementation, for example, when the set top box does not include DVR space, the snapshot of camera 403 may be stored in another set top box in a different room, for example, through Multi-Room DVR service. In yet another implementation, display device 214 may include DVR space. In still another implementation, the snapshot of camera 403 may be stored in a backend component of network 200, such as snapshot storage 244 of data center 240. The snapshot of camera 403, as well as any additional search criteria (e.g., metadata), may be stored in a number of places, and not necessarily all in the same place, provided snapshot search system 242 may retrieve this information (i.e., search criteria) so that a search may be performed.

Snapshot search system 242 may perform a search with the search criterion provided (e.g., object, camera 403). Snapshot search system 242 may search for matches within the content residing in video hub office 250 and/or asset network 270.

In one implementation, for example, snapshot search system 242 may conduct a general search or a restrictive search. For example, snapshot search system 242 may conduct a search within a Vacation Products Inc. repository, since the TV viewer is watching a Vacation Products Inc. commercial. In this regard, this type of search may be considered a restrictive search, since snapshot search system 242 may search for matches only within the Vacation Products Inc. repository. In another example, snapshot search engine system 242 may conduct a more general search depending on, for example, the product, the program and/or the search criteria. For example, a search may be considered a general search when snapshot search engine system 242 searches other manufacturers' repositories that manufacture cameras.

Figure 6:
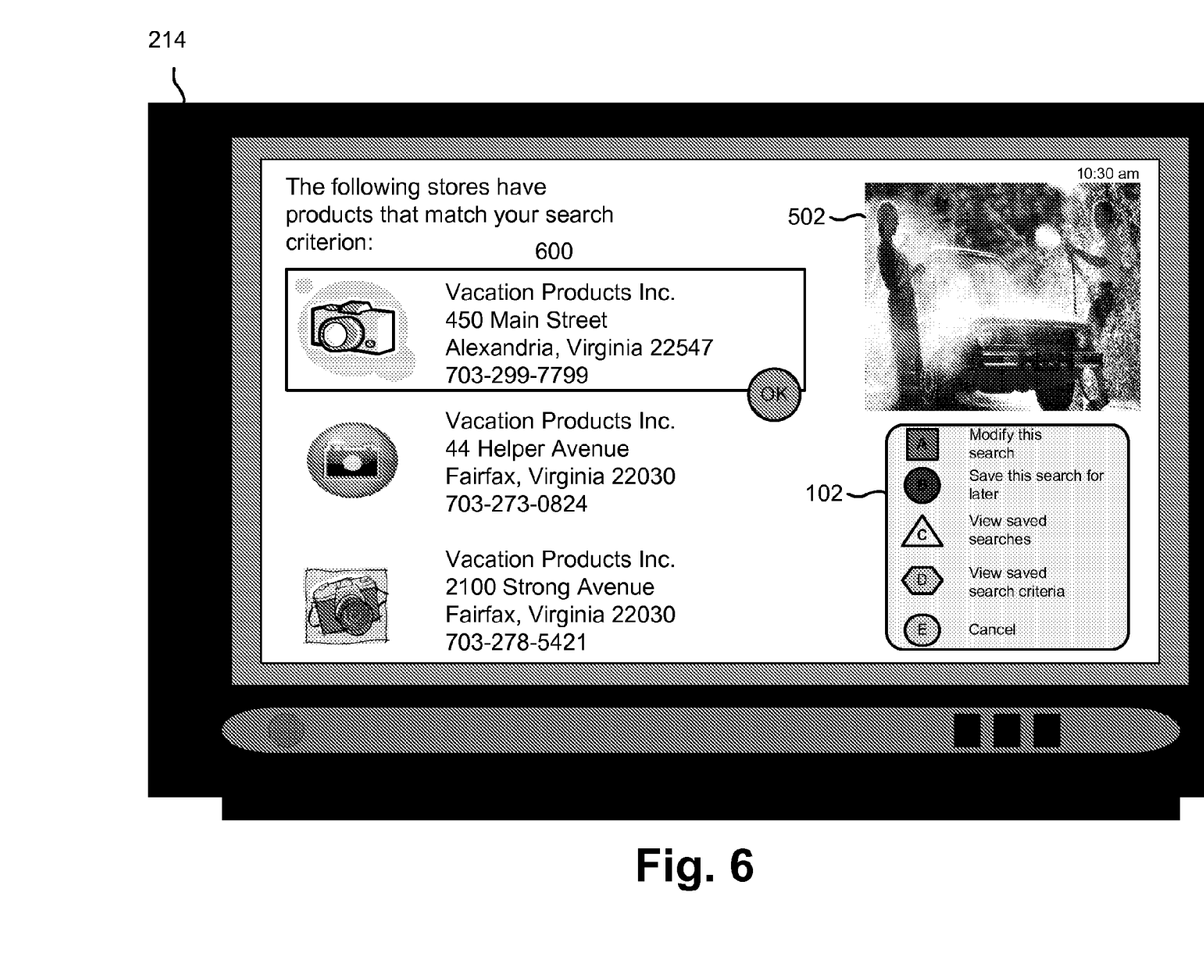

FIG. 6 is a diagram illustrating exemplary content displayed to the TV viewer after snapshot search system 242 completes a search. FIG. 6 illustrates, among other things, search results 600 and GUI component 102. In this example, search results 600 may include three stores (i.e., Vacation Products Inc.) that sell camera 403. In one implementation, for example, each result may include a snapshot of the product, (i.e., camera 403), and the address and the telephone number of the store (i.e., Vacation Products Inc.) where the TV viewer may purchase camera 403. Additionally, different information may be provided. For example, information such as price, colors available, summary of features, a map option, etc., may be displayed and/or accessed through the interactive content. Further, the user may be able to purchase the product (e.g., via Vacation Products Inc. web site).

The interactive content of GUI component 102 may provide additional selections to the TV viewer. In one implementation, for example, the interactive content of GUI component 102 may include the following selections, such as [A] to modify this search, [B] to save this search for later, [C] to view saved searches, [D] to view saved search criteria, and [E] to cancel.

The TV viewer may select [A] to further modify the search criteria, such as adding a search criterion, or removing a search criterion. In one implementation, for example, snapshot search engine system 242 may filter the existing search results 600 in view of the modified search criteria. Alternatively, or additionally, snapshot search system 242 may conduct a new, more general search or a new, more restrictive search based on the modified search criteria.

When the TV viewer selects [B], the TV viewer may be able to save search results 600. In one implementation, for example, the TV viewer may be able to save the entire search results 600. In another implementation, for example, the TV viewer may be able to save one or more selected items within search results 600. When the TV viewer selects [C] or [D], the TV viewer may be able to view previously saved searches or search criteria. The TV viewer may also cancel by selecting [E].

Figure 7:
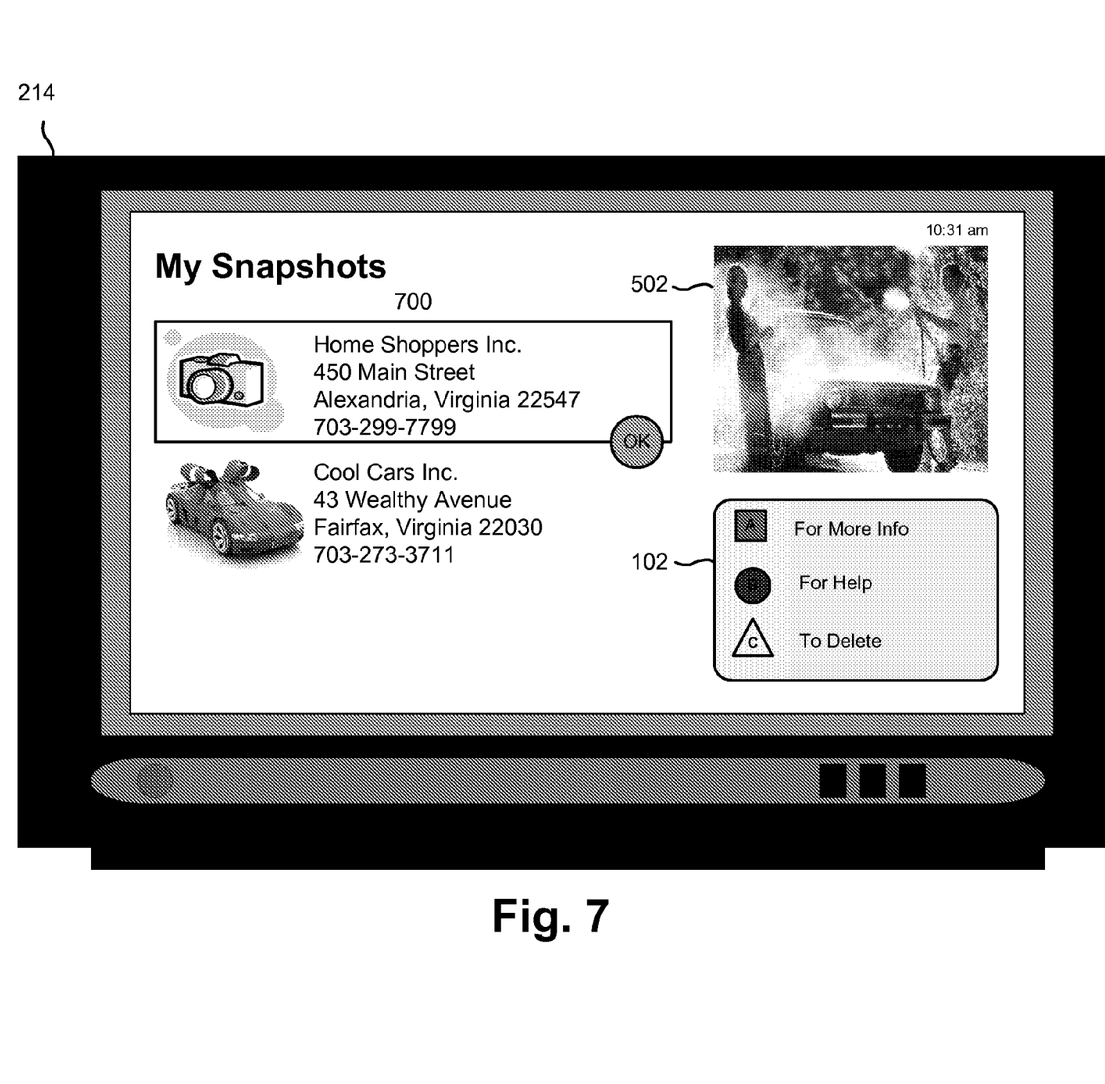

FIG. 7 is a diagram illustrating exemplary content of saved searches that may be displayed to the TV viewer. FIG. 7 illustrates, among other things, saved search 700 and GUI component 102. As illustrated in FIG. 7, in one implementation, saved search 700 may include a compilation of entries of products that were selected and saved from respective search results 600. In another implementation, for example, the entire search results 600 may be saved.

The interactive content of GUI component 102 may provide different selections to the TV viewer. In one implementation, for example, the interactive content of GUI component 102 may include the following selections, such as [A] for more information, [B] for help, and [C] to delete. The TV viewer may select [A] to access more information relating to the selected search result. In one implementation, for example, additional product information or store information may be displayed. When the TV viewer selects [B], the TV viewer may access a help menu. The TV viewer may also select [C] to delete any saved search 700.

Although not illustrated, the TV viewer may access a saved search criteria page, as discussed in reference to FIG. 5. The saved search criteria page could include a list of saved search criteria. For example, each entry in the list may include a snapshot of the object and any additional search criterion.

In view of the interconnectivity among communication and messaging systems, other options may be available to the TV viewer. For example, search results 600 and/or saved search 700 may be forwarded to other communication services, such as the TV viewer's e-mail address or mobile phone. Given the widespread use of portable and handheld devices, the TV viewer may access this information when shopping. Alternatively, or additionally, the TV viewer may forward this information to friends or other family members via his/her e-mail or mobile phone.

The foregoing description of implementations provides illustration, but is not intended to be exhaustive or to limit the implementations to the precise form disclosed. Modifications and variations are possible in light of the above teachings or may be acquired from practice of the teachings described herein. For example, the user may able to capture multiple frames of video, instead of just one frame of video. In some instances, this may be beneficial as it relates to the object recognition processes, such as categorizing and identifying the object.

Additionally, although the examples provided entailed the TV viewer retrieving information related to a product, other possibilities exist. For example, the TV viewer may be watching a program, such as a movie trailer, and would like to find information relating to the movie (e.g., summary, length of movie, show times, actors, etc.). Accordingly, the TV viewer may be able to retrieve information related to an assortment of different kinds of items.

In addition, while a series of blocks and/or acts have been described with regard to processes illustrated in FIGS. 3-7, the order of the blocks and/or acts may be modified in other implementations. For example, adding user profile information as a search criterion may be a global setting selected by a user before capturing all snapshots. Further, non-dependent acts may be performed in parallel. For example, blocks 304 and 306 may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    capturing, using one or more processors, a snapshot of a video program, during presentation of the video program on a video display;
    providing to a user, using one or more processors, on the video display, the snapshot of the video program during the presentation of the video program;
    performing, using one or more processors, object recognition using the snapshot of the video program;
    determining, using one or more processors, an object within the snapshot of the video program, based on the performed object recognition;
    providing to the user, using one or more processors, on the video display, a graphical user interface component that includes:
        a first option to conduct a first search based on the object,
        a second option to receive, from the user, at least one search criterion for a second search based on the object, the second option being different than the first option, and
        a third option to add information relating to the user as at least one other search criterion for a third search that is based on the object, the third option being different than the first option and the second option,
        the graphical user interface component being provided with the snapshot of the video program during the presentation of the video program;
    conducting, using one or more processors, the first search to generate first information associated with the object when the first option is selected;
    receiving from the user, using one or more processors, the at least one search criterion via the second option when the second option is selected,
        the at least one search criterion including information relating to the object;
    conducting, using one or more processors and using the at least one search criterion, the second search to generate second information associated with the object based on receiving the at least search criterion;
    conducting, using one or more processors, the third search to generate third information associated with the object when the third option is selected; and
    providing, using one or more processors and during the presentation of the video program, the generated first information, the generated second information, or the generated third information.

2. The method of claim 1, where capturing the snapshot of the video program comprises:
    providing, on the video display, interactive content to indicate that a snapshot can be taken; and
    detecting selection of the interactive content,
        where the snapshot of the video program is captured based on the detected selection of the interactive content.

3. The method of claim 1, where capturing the snapshot of the video program comprises:
    detecting selection of an interactive input mechanism,
        where the interactive input mechanism indicates that a snapshot can be taken, and
        where the snapshot of the video program is captured based on the detected selection of the interactive input mechanism.

4. The method of claim 1, where determining the object within the snapshot of the video program comprises:
    displaying, based on determining the object within the snapshot of the video program, visual cues to indicate the object within the snapshot.

5. The method of claim 1, where determining the object within the snapshot of the video program comprises:
    providing, with the video program, interactive content to indicate that a determination of the object can be saved;
    detecting selection, from the user, of the interactive content;
    saving the determination of the object, based on detecting the selection of the interactive content;
    retrieving the saved determination of the object based on an input from the user, after saving the determination of the object; and
    conducting a search based on the retrieved determination of the object.

6. The method of claim 1, where performing the object recognition comprises at least one of:
    comparing the snapshot to at least one of another snapshot or a video in an asset repository to perform the object recognition; or
    using at least one of tag information, closed-caption information, or channel information associated with the video program to perform the object recognition.

7. The method of claim 1, where the at least one other search criterion includes at least one of:
    information identifying a location of the user, information identifying a demographic associated with the user, or information identifying one or more preferences, of the user, relating to the object, and where the information relating to the object includes at least one of:

information identifying a price associated with the object, information identifying a color associated with the object, or information identifying one or more other objects associated with the object.

8. The method of claim 1, where providing the generated first information, the generated second information, or the generated third information comprises:

providing, on the display, information relating to purchasing the object.

9. The method of claim 1, where providing the generated first information, the generated second information, or the generated third information comprises:

providing, with the video program, interactive content to indicate that a plurality of search results from the first search or the second search can be saved;

detecting selection, from the user, of the interactive content; and saving a particular search result, of the plurality of search results, based on receiving the selection.

10. The method of claim 1, further comprising:

forwarding the generated first information, the generated second information, or the generated third information to at least one of:

an e-mail service associated with the user, or a mobile device associated with the user.

11. A system, comprising:

logic, implemented at least partially in hardware, to provide a video program to a video display;

logic, implemented at least partially in hardware, to provide, to the video display, interactive content to indicate that a snapshot of the video program can be captured during the provided video program;

logic, implemented at least partially in hardware, to capture a video frame of the video program during the provided video program based on the interactive content;

logic, implemented at least partially in hardware, to provide, to the video display, the captured video frame with the provided video program;

logic, implemented at least partially in hardware, to conduct a search that is based on the captured video frame;

logic, implemented at least partially in hardware, to present, on the video display, search results of the search that is based on the captured video frame, the search results being presented with the provided video program;

logic, implemented at least partially in hardware, to provide, to the video display, a graphical user interface component that includes:

a first option to modify one or more search criteria of the search that is based on the captured video frame, a second option, different than the first option, to save the search results, and a third option, different than the first option and the second option, to view information related to one or more searches, the graphical user interface component being provided with the video program and the search results;

logic, implemented at least partially in hardware, to save the search results when the second option is selected;

logic, implemented at least partially in hardware, to receive, from a user and via the first option, at least one search criterion after the search results have been presented when the first option is selected;

logic, implemented at least partially in hardware, to filter the presented search results based on the at least one search criterion when the at least search criterion is received; and logic, implemented at least partially in hardware, to view the information related to one or more searches when the third option is selected.

12. The system of claim 11, where the logic to capture comprises:

logic to detect selection from an input mechanism, based on the interactive content being provided, where the video frame of the video program is captured, during the provided video program, based on the detected selection from the input mechanism.

13. A network device comprising:

a memory to store one or more instructions; and a processor to execute the one or more instructions to:

obtain a video frame of a video program, the video frame being provided with the video program on a video display, perform object recognition using the video frame, identify a plurality of objects in the video frame based on performing the object recognition, provide, on the video display with the video program, a first graphical user interface component that includes a first plurality of options, the first plurality of options including:

a first option to conduct a first search that is based on one or more of the identified plurality of objects, a second option to receive one or more search criteria for a second search that is based on the one or more of the identified plurality of objects, the second option being different than the first option, or a third option to add information relating to a user, of the network device, as one or more other search criteria for a third search that is based on the one or more of the identified plurality of objects, the third option being different than the first option and the second option, the first graphical user interface component being provided, on the video display, with the video program and the video frame, receive, from the user, the one or more search criteria including information relating to the one or more of the identified plurality of objects when the second option is selected, conduct a particular search, when, conducting the particular search, the processor is to:

conduct the first search when the first option is selected, conduct the second search based on receiving the one or more search criteria and when the second option is selected, conduct the third search when the third option is selected, provide, to the user, results of conducting the particular search, the results being provided with the video program on the video display, provide, on the video display with the video program, a second graphical user interface component that includes a second plurality of options different than the first plurality of options, the second plurality of options including:
  a fourth option to modify at least one criterion of the particular search, and
  a fifth option, different than the fourth option, to save the results, when the fifth option is selected,
modify the at least one criterion when the fourth option is selected,
conduct another particular search based on modifying the at least one criterion, and
provide, to the user, results of conducting the other particular search, with the video program, on the video display.

14. The network device of claim 13, where the processor is further to:
identify the plurality of objects based on at least one of tag information associated with the video program, closed-caption information associated with the video program, or channel information associated with the video program,
where a first object, of the plurality of objects, is identified based the closed-caption information, and
where a second object, of the plurality of objects, is identified based on the channel information.

15. The network device of claim 13, where the processor is further to:
conduct another search based on metadata associated with another object of the plurality of objects; and
provide, to the user and on the video display, results of conducting the other search based on the metadata.

16. The network device of claim 13, where the processor is further to:
forward, based on the provided interactive content, the results of the search to at least one of:
  an e-mail address of the user, or
  a portable device of the user.

17. A non-transitory computer-readable medium for storing instructions, the instructions comprising:
one or more instructions which, when executed by a device, cause the device to receive a video frame of a video program, the video frame being provided with the video program on a video display;
one or more instructions which, when executed by the device, cause the device to identify an object in the video frame;
one or more instructions which, when executed by the device, cause the device to receive confirmation that the identified object, in the video frame, is correctly identified;
one or more instructions which, when executed by the device, cause the device to conduct a first search, based on search criteria associated with the identified object and when the confirmation is received, to obtain a first plurality of search results;
one or more instructions which, when executed by the device, cause the device to provide, on the video display, the first plurality of search results,
  the first plurality of search results being provided with the video program;
one or more instructions which, when executed by the device, cause the device to provide, on the video display, a graphical user interface component that includes:
  a first option to modify the first search,
  a second option, different than the first option, to save the first plurality of search results, and
  a third option, different than the first option and the second option, to view information related to one or more searches,
  the graphical user interface component being provided with the video program and the first plurality of search results;
one or more instructions which, when executed by the device, cause the device to save the first plurality of search results when the second option is selected;
one or more instructions which, when executed by the device, cause the device to provide, on the video display, the information related to the one or more searches when the third option is selected;
one or more instructions which, when executed by the device, cause the device to remove at least one search criterion from the search criteria when the first option is selected;
one or more instructions which, when executed by the device, cause the device to conduct, based on removing the at least one search criterion, a second search to obtain a second plurality of search results,
  the second search being based on the search criteria after the at least one search criterion has been removed; and
one or more instructions which, when executed by the device, cause the device to provide the second plurality of search results with the video program on the video display.

18. The non-transitory computer-readable medium of claim 17, where the one or more instructions to identify the object comprise:
one or more instructions which, when executed by the device, cause the device to provide interactive content identifying each object of a plurality of objects in the video frame, the plurality of objects including the object; and
one or more instructions which, when executed by the device, cause the device to detect selection of the interactive content that corresponds to the object,
where the confirmation is received based on detecting the selection of the interactive content that corresponds to the object.

19. The non-transitory computer-readable medium of claim 17, the instructions further comprising:
one or more instructions which, when executed by the device, cause the device to conduct the first search without receiving confirmation from a user that the identified object, in the video frame, is correctly identified, when no additional object is identified in the video frame.

20. The system of claim 11, further comprising:
logic to detect selection of a particular search result of the search results; and
logic to provide, with the video program, additional information regarding a product associated with the particular search result, based on detecting the selection of the particular search result.

21. The system of claim 11, further comprising:
logic to remove at least one other search criterion using the first option; and
logic to present, on the video display and based on removing the at least one other search criterion, different search results relating to the captured video frame,
  where the different search results are presented with the provided video program.

22. The system of claim 11, where the information related to the one or more searches includes:
information identifying one or more criteria of the one or more searches.

23. The method of claim 1, where the graphical user interface component further includes a fourth option to save the at least one search criterion, the fourth option being different than the first option, the second option, and the third option, and where the method further comprises:
saving, using one or more processors, the at least one search criterion for another search when the fourth option is selected.

24. The network device of claim 13, where the first plurality of options, included in the first graphical user interface component, further includes a sixth option to save the one or more search criteria, and where the processor is further to save the one or more search criteria when the sixth option is selected.

* * * * *